JAMES GLANDING.
Improvement in the Manufacture of Packing for Steam-Engines.
No. 4,907. Reissued May 21, 1872.
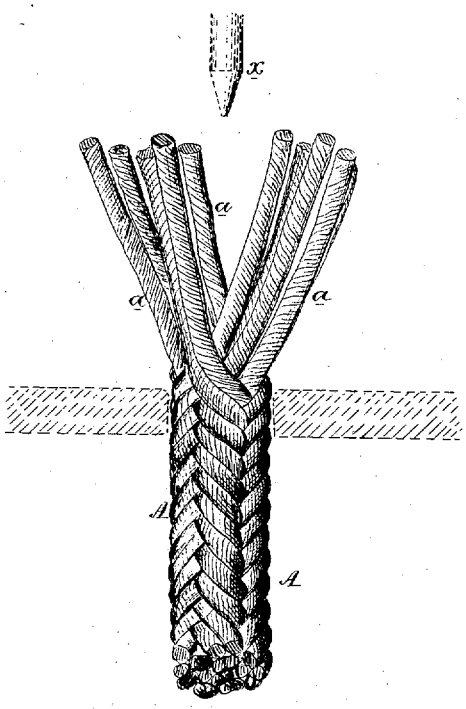
WITNESSES { John Parker
Thomas McKloain
James Glanding
David H. Wilson
and Edward S. Lowry
by their Attys
Howson and Sons

UNITED STATES PATENT OFFICE.

JAMES GLANDING, OF PHILADELPHIA, PENNSYLVANIA, ASSIGNOR TO HIMSELF, DAVID H. WILSON, AND EDWARD S. LOWRY.

IMPROVEMENT IN THE MANUFACTURE OF PACKING FOR STEAM-ENGINES.

Specification forming part of Letters Patent No. 77,275, dated April 28, 1868; reissue No. 4,907, dated May 21, 1872.

Specification describing an Improved Packing for Steam-Engines, &c., invented by JAMES GLANDING, of Philadelphia, county of Philadelphia, State of Pennsylvania.

This invention consists of a packing composed of fibrous strands into which melted paraffine, or stearine, or other equivalent lubricant, with or without any suitable powdered substance, is introduced during the plaiting of the strands together, as described hereafter, so that the fibers may be thoroughly impregnated with the said lubricant.

The figure in the accompanying drawing represents the packing as it appears during the process of manufacture.

A represents a mass of twisted fibrous strands, braided or plaited together so as to form a solid mass of twisted fibers of hemp, jute, cotton, or their equivalent. The braid at or near the point where the different strands are interlocked may pass through an opening in a plate, X, by means of which the strands are condensed, and the braid rendered uniform in thickness. Through a nozzle, *x*, flows melted paraffine, or stearine, or a mixture of paraffine and powdered substance, or any other lubricating material or composition, the lubricant being thus introduced to the strands at or about the point where they are being united, so as to thoroughly saturate them and fill the interstices between the fibers, and the same plan of introducing the lubricant to the strands is adopted, no matter how the strands are interlocked, how numerous the strands may be, or how many layers of braid compose the packing.

Lubricating materials have heretofore been applied to packings either by passing the latter, after the strands composing the same have been combined, through the lubricant, or by passing the strands or layers separately through the lubricant before combining them.

It will be seen that by the above-described process the lubricant is introduced among the strands during the process of plaiting them together, and that, as subsequent lubrication is unnecessary, the expense of manufacturing the packing is greatly reduced, and the packing itself more thoroughly impregnated than by processes heretofore practised.

We claim as the invention—

1. The process herein described of applying lubricating material to packing—that is to say, introducing the material among the fibrous strands during the plaiting of the latter together—substantially as specified.

2. As a new article of manufacture, a packing of braided or plaited fibrous strands with which lubricating material has been incorporated, substantially as specified.

In testimony whereof we have signed our names to this specification in the presence of two subscribing witnesses.

JAS. GLANDING.
DAVID H. WILSON.
EDWARD S. LOWRY.

Witnesses:
WM. A. STEEL,
HARRY SMITH.